Dec. 2, 1947.  M. A. BARNETT  2,431,982
THREE SPEED BICYCLE GEAR SHIFT
Filed May 16, 1946  2 Sheets—Sheet 1

Inventor,
MILTON A. BARNETT.

By E. E. Vrooman & Co.,
Attorneys.

Dec. 2, 1947.                M. A. BARNETT                2,431,982
                      THREE SPEED BICYCLE GEAR SHIFT
              Filed May 16, 1946              2 Sheets-Sheet 2
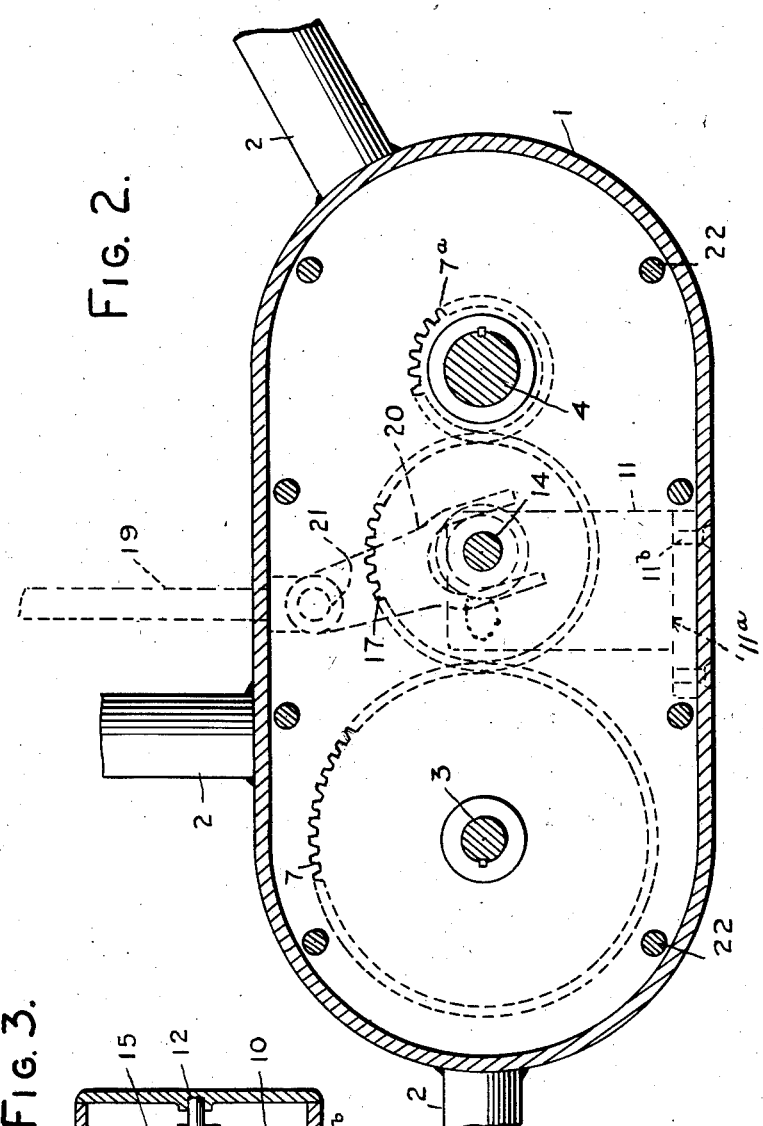
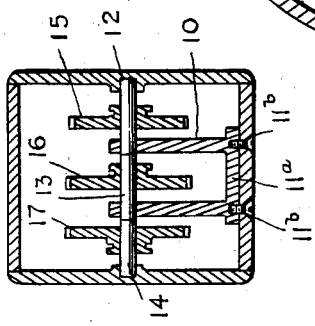
Inventor,
MILTON A. BARNETT.

Patented Dec. 2, 1947

2,431,982

UNITED STATES PATENT OFFICE 2,431,982

THREE-SPEED BICYCLE GEARSHIFT

Milton A. Barnett, St. Louis, Mo.

Application May 16, 1946, Serial No. 670,251

3 Claims. (Cl. 74—331)

This invention relates to a three speed bicycle gear shift.

An object of the invention is the construction within a gear housing or casing of a mechanism including a plurality of gears arranged in a horizontal condition, and capable of being shifted in a horizontal plane.

Another object of the invention is the construction of an efficient and durable gear mechanism employed in the construction of a bicycle, whereby the driving or propulsion of the bicycle is easily accomplished with relatively a small amount of exertion by the rider.

With the foregoing and other objects in view, my invention comprises certain novel constructions, combinations, and arrangements of parts as will be hereinafter fully described, illustrated in the accompanying drawings, and more particularly pointed out in the appended claims.

In the drawings:

Figure 2 is a vertical longitudinal sectional view through the housing or casing showing in dotted lines the position of the gears within the casing.

Figure 3 is a transverse sectional view taken on line 3—3 of Fig. 1, and looking in the direction of the arrows.

Figure 1:
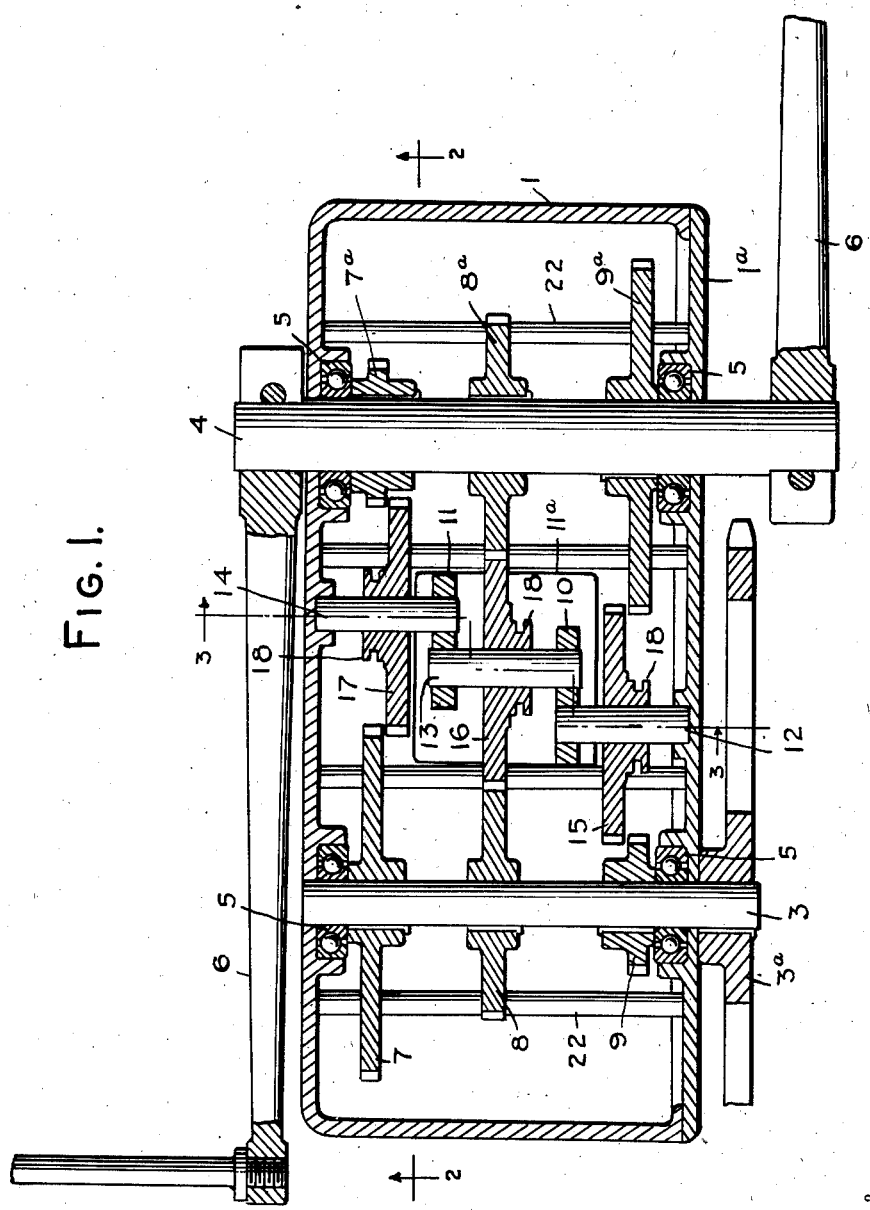
Figure 1 is a horizontal longitudinal sectional view of a housing or casing and mechanism constructed in accordance with the present invention.

Referring to the drawings in which I have shown the preferred embodiment of my invention, 1 designates an elongated housing or casing which is suitably supported upon the bicycle frame 2. Extending transversely of the casing 1 is a drive shaft 3, and a pedal shaft 4. These shafts are mounted in suitable ball-bearings 5. Pedals 6 are fixedly secured to the pedal shaft 4 outside of casing 1.

On the drive shaft 3 is fixedly secured the low speed driven gear 7, the standard speed driven gear 8, and the high speed driven gear 9. On the pedal shaft 4 is fixedly secured the low speed driving gear 7ª, the standard speed drive gear 8ª, and the high speed drive gear 9ª.

It is to be understood that the shafts 3 and 4 are in the same horizontal plane so that the entire mechanism is in substantially the same horizontal plane.

Between the sides of the elongated casing 1 are plate-like vertical supports 10 and 11. A side stub shaft 12 is mounted at its outer end upon casing 1 and at its inner end upon the plate-like vertical support 10. Intermediate stub shaft 13 has one end mounted upon plate-like support 10 and its other end is mounted upon plate-like support 11. Side stub shaft 14 has its outer end fixedly mounted upon the side of casing 1 and its inner end is fixedly mounted upon the plate-like support 11. Therefore it will be seen upon referring to Figure 1 that the supports 10 and 11 as well as shafts 12, 13, and 14 are arranged out of alignment transversely of casing 1, for efficiently supporting the idle gears hereinafter described.

A high speed idle gear 15 is mounted upon side stub shaft 12, and is adapted to mesh with gears 9 and 9ª. A standard speed idler gear 16 is mounted upon intermediate stub shaft 13, and as shown in Fig. 1 this gear meshes with gears 8 and 8ª. Low speed idle gear 17 is loosely mounted upon stub shaft 14, and is adapted to mesh with gears 7 and 7ª. Each idle gear 15, 16, and 17 is provided with a grooved bracket engaging flange 18.

Suitable manually controlled operating means may be provided for operating or shifting in and out of mesh the idle gears 15, 16, and 17. For instance, as shown in dotted lines Fig. 2, a gear shift lever 19 may be employed together with a forked bracket 20, these two elements being connected by gear shift shaft 21. The fork of bracket 20 is seated in the grooved bracket engaging flange 18, so as to adjust the idle gear as the operator desires.

The casing 1 is preferably provided with a removable side 1ª; the casing and its side, as well as the mechanism within the casing are retained in their assembled position by transverse bolts 22.

In my mechanism I have invented a very compact gear arrangement in a horizontal plane, which enables the mechanism to be placed upon a bicycle in a relatively small space, and by reason of the peculiar arrangement highly satisfactory results are obtained in operating a bicycle equipped with this mechanism.

While I have described the preferred embodiment of my invention and illustrated the same in the accompanying drawings, certain minor changes or alterations may appear to one skilled in the art to which this invention relates during the extensive manufacture of the same, and I, therefore, reserve the right to make such changes or alterations as shall fairly fall within the scope of the appended claims.

On the drive shaft 3 is sprocket wheel 3ª. The sprocket wheel is rotated in the usual manner, to impart rotary movement to the wheels, when the bicycle is being used.

The vertical plate-like supports 10 and 11 are integral with the horizontal base 11ª, and said base is secured upon the bottom of casing 1 by screws 11ᵇ.

What I claim is:

1. In a mechanism of the class described, the combination with a casing, of a drive shaft in said casing, a pedal shaft in said casing in the same horizontal plane with said drive shaft, three gears fixedly secured upon said drive shaft, three gears fixedly secured upon said pedal shaft, three stub shafts between and in the same horizontal plane with said drive and pedal shafts, means supporting said stub shafts upon said casing, and idle gears on said stub shafts and being adapted to mesh with their corresponding pedal shaft gears and drive shaft gears.

2. In a mechanism of the class described, the combination with an elongated casing, of a drive shaft extending transversely of said casing, a pedal shaft extending transversely of said casing and in the same horizontal plane with said drive shaft, three gears fixedly secured upon said drive shaft, three gears fixedly secured upon said pedal shaft, stub shafts between and in the same horizontal plane with said drive and pedal shaft, means supporting said stub shafts out of transverse alignment upon said casing, and idle gears on said stub shafts and being adapted to mesh with their corresponding pedal shaft gears and drive shaft gears.

3. In a mechanism of the class described, the combination with an elongated casing, of a drive shaft extending transversely of said casing, ball-bearing devices supporting said drive shaft upon said casing, a pedal shaft extending transversely of said casing, ball-bearing devices supporting said pedal shaft upon said casing, said drive and pedal shafts being in horizontal alignment, a pair of vertical plate supports upon said casing and positioned near its center and between its sides, gears fixedly secured to said drive shaft, gears fixedly secured to said pedal shaft, said vertical plate supports being arranged in staggered position transversely of said casing, side stub shafts having their outer ends fixedly mounted on the sides of said casing and their inner ends fixedly mounted upon said vertical plate supports, an intermediate stub shaft having its ends fixedly mounted upon said pair of vertical plate supports, said stub shafts all being in the same horizontal plane with said drive and pedal shafts, and idle gears on said stub shafts and being adapted to mesh with their corresponding pedal shaft gears and drive shaft gears, substantially as shown and described.

MILTON A. BARNETT.

REFERENCES CITED

The following references are of record in the file of this patent:

UNITED STATES PATENTS

| Number | Name | Date |
|---|---|---|
| 702,930 | Dicks | June 24, 1902 |
| 2,061,225 | Duvall | Nov. 17, 1936 |
| 2,210,221 | Sperry | Aug. 6, 1940 |